Figure 1:
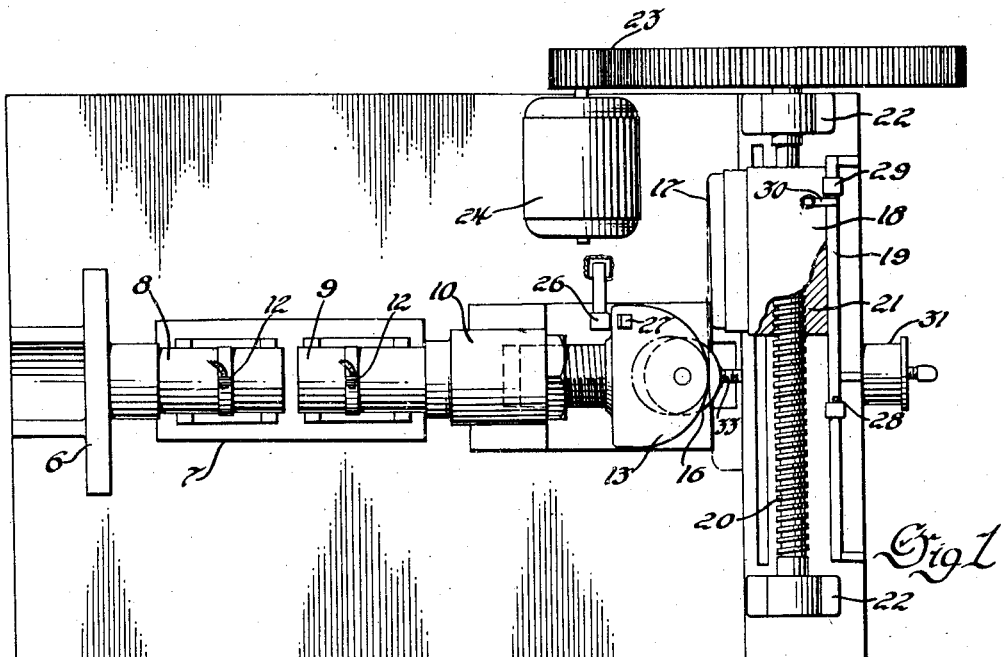

Oct. 22, 1946.      J. W. HACKETT ET AL      2,409,850
HYDRAULIC FEED MEANS
Filed March 1, 1944

Inventors
James W. Hackett &
Kenneth L. G. Coppieny
By Blackmor, Spencer & Oliver
Attorneys Patented Oct. 22, 1946

2,409,850

UNITED STATES PATENT OFFICE 2,409,850

HYDRAULIC FEED MEANS

James W. Hackett, Newark, Ohio, and Kenneth L. G. Copping, Detroit, Mich., assignors to General Motors Corporation, Detroit, Mich., a corporation of Delaware Application March 1, 1944, Serial No. 524,548

3 Claims. (Cl. 219—4)

The invention relates to a machine for the butt welding of blanks or work-pieces by first heating the proximate areas thereof by a "flashing" or "burning-off" process and then forcibly bringing the parts into welding relation and thereby causing coalescence of the heated or fused areas.

In producing welds by this procedure, it is customary to feed the work-pieces toward each other at a relatively slow rate while supplying electric current, thereby causing an arc which fuses the material of the approaching surfaces and discharges it in a shower of sparks. This period of operation is commonly termed the "flash" or "burn-off" period.

When the areas to be joined have reached the temperature necessary to produce a satisfactory weld, the parts are suddenly forced together under very high pressure to effect the weld. The period of this operation is commonly termed the "push-up" or "upset" period.

It has been common practice to employ a motor operated cam for feeding the work-pieces during both of the periods mentioned, the cam being provided with a relative gradual incline to effect the slow feed and a steep incline for the push-up period.

These devices are particularly suitable for the upsetting step since they are capable of exerting very great force such as is required for forcing together blanks of considerable size where a pressure of as high as 40,000 to 60,000 pounds may be required. The cam feeds, however, are not suited for use in controlling the burn-off period because the latter varies so widely in both time and rate of travel, depending upon size, shape and material of the work-pieces, and requires a considerable amount of testing and adjustment to get exactly the proper extent of heating before the push-up occurs.

The object broadly of the present invention is to retain the advantages of a cam-operated or other push-up device of high power factor but to combine with it an additional feeding mechanism taking over the functions of the low-speed advance during the flash period and capable of unlimited adjustment as to time or rate of feed. Further objects and advantages will appear from the following description.

The machine of the present invention comprises, more specifically, means for supporting work-pieces, electrodes for supplying suitable current and means for moving one work-piece toward the other. The last means comprises a hydraulic motor device capable of very accurate adjustment as to time, rate and extent of travel and including a piston and cylinder, a source of fluid under pressure and suitable valve devices for controlling the supply of the fluid to the cylinder at any desired rate. The work feeding means includes further a power operated device such as a cam for effecting the final upset and means for timing the operation of the said device in any desired relation to the time and extent of travel of the hydraulic means.

Figure 2:
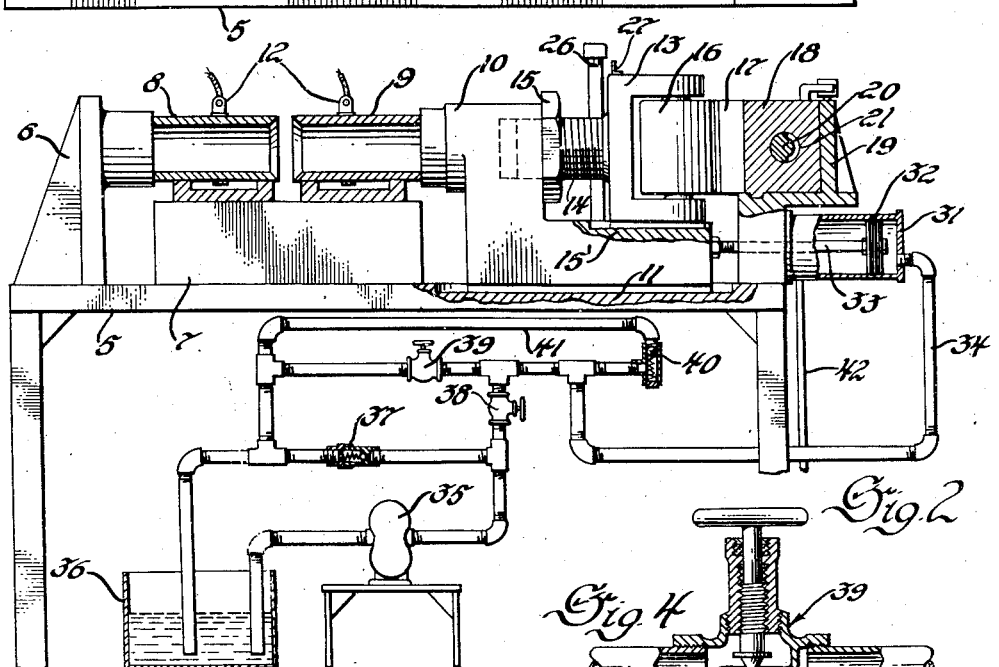
Figure 4:
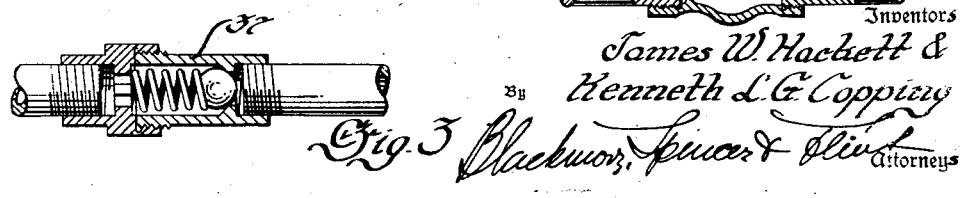
Figure 3:
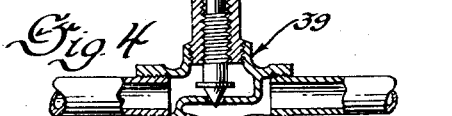

In the accompanying drawing, illustrating one embodiment of the invention,

Figure 1 is a plan view,

Figure 2 an elevation of a welding machine,

Figure 3 a section of a relief valve forming part of the fluid pressure system, and Figure 4 shows a section of a needle valve.

In the drawing, 5 indicates a base or stand on which is mounted an end abutment 6 and a support 7 adapted to receive work-pieces 8, 9, shown as sections of tubing. The work-piece 8 is supported against the abutment 6 whereas the work-piece 9 is so carried on the support 7 as to be capable of sliding toward the work piece 8. The end of piece 9 remote from piece 8 is engageable by an abutment 10 arranged to slide on the stand 5 as at 11. Suitable electrodes 12 are provided to convey electric current to the work-pieces.

A tail-piece 13 is carried on abutment 10 and is adjustable as by screw 14 and nut 15, being supported in guides 15' on the abutment. A roller 16 is mounted on the tail-piece arranged to be engaged by a cam member 17 to move the tail-piece 13 and through it the abutment 10 toward abutment 6, thereby forcing the work-pieces together.

Cam 17 is carried by a block 18 arranged to be reciprocated in guides 19 on the base 5. Motion may be communicated to the block by a screw 20 operating in a threaded portion 21 in the block 18, the screw being supported in suitable bearings 22 and rotated by gears 23 driven by electric motor 24.

Control devices for motor 24 may comprise a starting switch 26, operable by a finger 27 on tail-piece 13, and reversing and stop switches 28, 29, operable by an arm 30 on block 18. These control devices will, of course, be of any usual type permitting adjustment to determine the initiation and termination of the desired periods of movement. Thus, it will be seen that, when abutment 10 carrying tail-piece 13 has advanced sufficiently to operate switch 26, the block 18 will travel along the guides 19, bringing cam 17 into engagement with roller 16, thereby forcing abutment 10 toward abutment 6 and the block will then be returned to its initial position. This cycle of operations completes what is termed the "push-up" movement of the work.

The preliminary heating or "burn-off" movement is effected by fluid pressure means comprising a cylinder 31 in which is a piston 32, the piston rod 33 of which is connected to the sliding abutment 10. Fluid under pressure, for example oil, can be supplied to cylinder 31 through a pipe 34 by means of a pump 35 from a reservoir 36. A relief valve 37 of any standard or suitable construction determines the desired initial constant pressure of the oil delivered by the pump and two additional valves 38, 39, which may be of the familiar needle valve type, are provided to determine exactly the rate of feed to the cylinder 31, and hence the rate of movement of the work during the burn-off period and the time before push-up occurs. If the valve 38 be opened and valve 39 be closed, the entire delivery of the pump above that returned through relief valve 37 would flow to the cylinder. The proportion of such delivery actually supplied to the cylinder is fixed by the adjustment of valve 39 which, when opened, permits return to the reservoir. Thus, the setting of valve 39 enables the operator to maintain a very exact rate of feed to the cylinder while the valve 38 can be opened and closed to start or stop successive operations without disturbing the predetermined rate of travel of the piston fixed by adjustment of valve 39.

A check valve 40 is provided, opening in the direction of flow to the cylinder and connected to the reservoir through pipe 41 bypassing the valves 38, 39. This check valve permits additional liquid to be supplied to the cylinder when the sudden push-up movement is effected by cam 17, at which time the piston 32 is required to accelerate temporarily its rate of travel. A pipe connection 42 from a suitable source of fluid pressure, e. g., air, may also be provided to return the piston 32 to its initial position after each welding operation. If this source is air at a pressure below that delivered by pump 35, it does not affect the rate of advance.

It will be seen from the foregoing description that we have provided separate sources of power for the two operations involved in flash welding, the first operable during the burn-off period being a relatively low pressure hydraulic system, which, since it is required to exert very little effort, may be of very light and simple construction but capable of great exactness of timing, the other capable of exerting the "brute strength" necessary for the final push-up. The two systems, while adapted for independent adjustment, are so coordinated that the initiation of the second stage is controlled exactly by the completion of the first while the controls of the first enable the operator to adjust the timing at will and to experiment with or vary the burn-off period as may be desired. Thus, our improvements adapt the machine for a very wide range of work and facilitate expeditious setting up without necessitating any change in or replacement of parts.

It will be understood that the embodiment disclosed herein is presented by way of illustration and that the invention is not intended to be restricted thereto except as required by the terms of the claims.

We claim:

1. Electric welding mechanism comprising means for supporting work pieces and for supplying electric current thereto, means arranged to move said work pieces toward each other at a relatively slow rate during a burn-off period, said moving means comprising a hydraulic cylinder and piston, and means to supply fluid to said cylinder at a predetermined rate and pressure, additional moving means adapted and arranged to move said work pieces toward each other at a relatively rapid rate during a push-up period, said additional means comprising an electric motor, and control means for said motor arranged to be actuated by said first moving means after a predetermined extent of movement thereof.

2. Electric welding mechanism comprising supports for work-pieces, means for supplying electric current thereto, means for moving one piece toward the other, a cylinder and piston arranged to actuate said moving means, a source of liquid under pressure connected to said cylinder, valve means adapted to control the rate of flow to said cylinder and to initiate and interrupt said flow, a cam mechanism arranged to pick up said moving means and move same at a more rapid rate, an electric motor for actuating said cam mechanism, and starting and stopping switches for controlling said motor, a starting switch being positioned to be actuated after a predetermined extent of movement of said moving means.

3. Electric welding mechanism comprising supports for work-pieces, means for supplying electric current thereto, means for moving one piece toward the other, a cylinder and piston arranged to actuate said moving means, a source of liquid under substantially constant pressure connected to said cylinder, valve means adapted to predetermine a constant rate of flow to said cylinder, means to return the piston to its initial position upon interruption of said flow, means controlled by movement of said moving means for increasing the rate of movement thereof while said rate of flow remains constant, and means for increasing the supply of liquid to said cylinder upon said increase of rate of movement.

JAMES W. HACKETT.
KENNETH L. G. COPPING.